United States Patent
Cao et al.

(10) Patent No.: US 11,104,828 B1
(45) Date of Patent: Aug. 31, 2021

(54) SOLVENTLESS SILICONE PRESSURE SENSITIVE ADHESIVE AND METHODS FOR MAKING AND USING SAME

(71) Applicant: Dow Silicones Corporation, Midland, MI (US)

(72) Inventors: Qing Cao, Shanghai (CN); Yan Zhou, Shanghai (CN); Chao Ma, Shanghai (CN)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/055,631

(22) PCT Filed: Jun. 29, 2018

(86) PCT No.: PCT/CN2018/093730
§ 371 (c)(1),
(2) Date: Nov. 16, 2020

(87) PCT Pub. No.: WO2020/000389
PCT Pub. Date: Jan. 2, 2020

(51) Int. Cl.
*C09J 183/04* (2006.01)
*C09J 7/38* (2018.01)
*C09J 11/06* (2006.01)
*C09J 5/02* (2006.01)

(52) U.S. Cl.
CPC ............... *C09J 7/381* (2018.01); *C09J 5/02* (2013.01); *C09J 11/06* (2013.01); *C09J 183/04* (2013.01); *C09J 2203/326* (2013.01); *C09J 2301/312* (2020.08)

(58) Field of Classification Search
None
See application file for complete search history.

(56) References Cited

U.S. PATENT DOCUMENTS

| | | |
|---|---|---|
| 2,676,182 A | 4/1954 | Daudt |
| 3,159,601 A | 12/1964 | Ashby |
| 3,220,972 A | 11/1965 | Lamoreaux |
| 3,296,291 A | 1/1967 | Chalk |
| 3,419,593 A | 12/1968 | Willing |
| 3,516,946 A | 6/1970 | Modic |
| 3,691,206 A | 9/1972 | Northrup |
| 3,814,730 A | 6/1974 | Karstedt |
| 3,989,668 A | 11/1976 | Lee et al. |
| 4,374,967 A | 2/1983 | Brown et al. |
| 4,584,355 A | 4/1986 | Blizzard et al. |
| 4,585,836 A | 4/1986 | Homan et al. |
| 4,591,622 A | 5/1986 | Blizzard et al. |
| 4,611,042 A | 9/1986 | Rivers-Farrell et al. |
| 4,766,176 A | 8/1988 | Lee et al. |
| 4,774,297 A * | 9/1988 | Murakami .............. C09J 183/04 525/478 |
| 4,774,310 A | 9/1988 | Butler |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 5,190,827 A * | 3/1993 | Lin .......................... C09J 183/04 428/447 |
| 5,270,110 A | 12/1993 | Murakami et al. |
| 5,357,007 A | 10/1994 | Wengrovius et al. |
| 5,360,833 A | 11/1994 | Eckberg et al. |
| 5,366,809 A * | 11/1994 | Schmidt ................. C09J 183/04 428/447 |
| 5,369,205 A | 11/1994 | Eckberg et al. |
| 5,466,532 A * | 11/1995 | Wengrovius ........... C09J 183/04 428/447 |
| 5,468,816 A | 11/1995 | Hurford et al. |
| 5,468,828 A | 11/1995 | Hurford et al. |
| 5,494,797 A | 2/1996 | McCann et al. |
| 5,567,764 A | 10/1996 | Brasseur et al. |
| 6,020,412 A | 2/2000 | Muschelewicz et al. |
| 6,121,368 A | 9/2000 | Heying et al. |
| 6,353,075 B1 | 3/2002 | Hupfield et al. |
| 6,806,339 B2 | 10/2004 | Cray et al. |
| 7,005,475 B2 | 2/2006 | Griswold |
| 7,687,591 B2 | 3/2010 | Bhagwagar et al. |
| 7,728,080 B2 | 6/2010 | Aoki |
| 7,842,755 B2 | 11/2010 | Morita et al. |
| 8,058,190 B2 | 11/2011 | Sweet et al. |
| 8,093,339 B2 | 1/2012 | White et al. |
| 8,436,122 B2 | 5/2013 | Kho et al. |
| 8,580,073 B2 | 11/2013 | Behl |
| 8,618,234 B2 | 12/2013 | Mizuno et al. |
| 9,303,164 B2 | 4/2016 | Takanashi |
| 9,365,757 B2 | 6/2016 | Mayumi et al. |
| 9,562,149 B2 | 2/2017 | Cray |
| 9,777,203 B2 | 10/2017 | Newsham et al. |

(Continued)

FOREIGN PATENT DOCUMENTS

| | | |
|---|---|---|
| CN | 102174309 | 9/2011 |
| CN | 102174309 | 8/2014 |

(Continued)

OTHER PUBLICATIONS

Search report from corresponding Japan 2019-544006 application, dated Sep. 1, 2020.

*Primary Examiner* — Anish P Desai
(74) *Attorney, Agent, or Firm* — Catherine U. Brown

(57) ABSTRACT

A solventless silicone pressure sensitive adhesive composition includes: (A) a polydiorganosiloxane having a monovalent hydrocarbon group with terminal aliphatic unsaturation, (B) a branched polyorganosiloxane having a monovalent hydrocarbon group with terminal aliphatic unsaturation, (C) a polyorganosilicate resin, (D) an olefinic reactive diluent, (E) a polyorganohydrogensiloxane, (F) a hydrosilylation reaction catalyst, and (G) an anchorage additive. This solventless silicone pressure sensitive adhesive composition can be cured to form a pressure sensitive adhesive. When cured on a backing substrate, the resulting adhesive article is useful for protecting electronic devices during fabrication, shipping, and use.

13 Claims, 1 Drawing Sheet

(56) References Cited

U.S. PATENT DOCUMENTS

| | | | |
|---|---|---|---|
| 10,253,139 B2 | 4/2019 | Iguchi et al. | |
| 10,513,629 B2 | 12/2019 | Huang | |
| 10,774,217 B2 | 9/2020 | Bekemeier et al. | |
| 2006/0189767 A1* | 8/2006 | Bhagwagar | C09J 183/04 525/477 |
| 2007/0289495 A1 | 12/2007 | Cray et al. | |
| 2011/0111217 A1 | 5/2011 | Kuroda et al. | |
| 2012/0045634 A1 | 2/2012 | Irie et al. | |
| 2012/0328863 A1 | 12/2012 | Kuo | |
| 2015/0119518 A1 | 4/2015 | Ihara | |
| 2016/0053056 A1 | 2/2016 | Gould et al. | |
| 2016/0053148 A1 | 2/2016 | Tsuchida | |
| 2016/0376475 A1 | 12/2016 | Huang et al. | |
| 2016/0376482 A1 | 12/2016 | Morgeneyer et al. | |
| 2017/0233612 A1 | 8/2017 | Han et al. | |
| 2019/0316000 A1 | 10/2019 | Huang et al. | |
| 2020/0071578 A1 | 3/2020 | Huo et al. | |
| 2020/0087514 A1 | 3/2020 | Fukui et al. | |

FOREIGN PATENT DOCUMENTS

| | | |
|---|---|---|
| CN | 105102576 | 11/2015 |
| EP | 0216376 | 4/1987 |
| EP | 0347895 | 12/1989 |
| FR | 2719598 | 11/1995 |
| JP | 8209104 | 8/1996 |
| JP | 2006160923 | 6/2006 |
| JP | 2008274251 | 11/2008 |
| JP | 2015214637 | 12/2015 |
| WO | 2013123619 | 8/2013 |
| WO | 2019049365 | 3/2019 |
| WO | 2019079366 | 4/2019 |
| WO | 2019159611 | 8/2019 |
| WO | 2020000389 | 1/2020 |

* cited by examiner

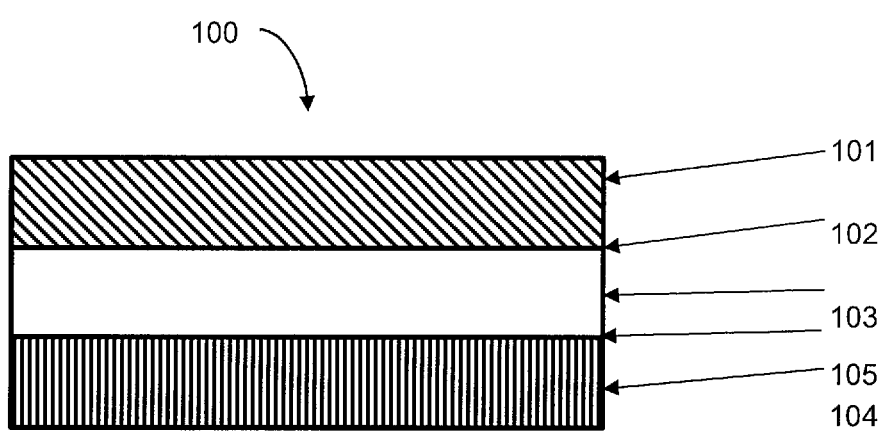

SOLVENTLESS SILICONE PRESSURE SENSITIVE ADHESIVE AND METHODS FOR MAKING AND USING SAME

This application is a U.S. national stage filing under 35 U.S.C. § 371 of PCT Application No. PCT/CN18/093730 filed on 29 Jun. 2018, currently pending. PCT Application No. PCT/CN18/093730 is hereby incorporated by reference.

TECHNICAL FIELD

A solventless silicone pressure sensitive adhesive composition is curable via hydrosilylation reaction. A pressure sensitive adhesive laminate article prepared by curing this composition on a substrate is useful in electronics applications for protection and/or masking during processing.

BACKGROUND

Protective films and carrier tapes are two major applications in the electronics fabrication industry for silicone pressure sensitive adhesives. Usually the thickness of pressure sensitive adhesives (PSAs) in protective films and carrier tapes is relatively thinner than traditional tape applications. Commercially available PSAs for these applications are predominantly solvent based. Due to environmental concerns and limitations on volatile organic compounds, customers desire to use solventless PSAs. Relatively low viscosity is desirable for certain coating processes, such as for coating relatively thin PSA layers onto substrates. To achieve a low viscosity, silicone polymers with short chains may use in solventless PSAs. However, solventless PSAs with a low viscosity may bring a variety of problems including electrostatic-induced or surface tension-induced flowing of the PSA composition on the substrate surface, resulting in non-uniform adhesive coverage on substrates and thus an uneven adhesive coating surface. The non-uniform adhesive coverage on substrates may suffer from the drawback of having too high adhesion for protective films in which the solventless PSAs may cause damage to protected substrates when protective film removed. Moreover, the uneven adhesive surface may suffer from the drawback of having unstable adhesion for carrier tapes during processing protection, in which may cause surface damage or quality issues in surface protection and/or process masking when the carrier tape is removed.

Problem to be Solved

There is a need in the electronics fabrication industry for solventless pressure sensitive adhesives that have one or more of the following properties: good processability, suitable peeling force, and flat surfaces of pressure sensitive adhesive coatings.

SUMMARY

A solventless silicone pressure sensitive adhesive composition comprises:
(A) a polydiorganosiloxane comprising having terminal silicon bonded monovalent hydrocarbon groups with terminal aliphatic unsaturation,
(B) a branched polyorganosiloxane having terminal silicon bonded monovalent hydrocarbon groups with terminal aliphatic unsaturation,
where starting materials (A) and (B) are present in amounts sufficient to provide a weight ratio of starting material (B) to starting material (A) (B/A ratio) of 0.2/1 to 20/1;
(C) a polyorganosilicate resin,
where starting materials (A), (B) and (C) are present in amounts sufficient to provide a weight ratio of amount of starting material (C) to combined amounts of starting materials (A) and (B) (resin/polymer ratio) of 0.05/1 to 1.5/1;
(D) >0% to <5%, based on combined weights of all starting materials in the composition, of an olefinic reactive diluent,
(E) a polyorganohydrogensiloxane; and
(F) a hydrosilylation reaction catalyst in an amount sufficient to provide 1 to 1000 ppm of platinum group metal based on combined weights of all starting materials in the composition; where the starting materials are present in amounts such that a molar ratio of silicon bonded hydrogen atoms to monovalent hydrocarbon groups with terminal aliphatic unsaturation (SiH/Vi) ratio is 0.5/1:50/1, based on combined molar amounts of all starting materials in the composition.

The solventless silicone pressure sensitive adhesive may be used to prepare an adhesive article in a method comprising: 1) coating the composition on a surface of a backing substrate, and 2) curing the composition to form a pressure sensitive adhesive on the surface of the backing substrate.

The adhesive article prepared as described above may be adhered to an electronic device such that the pressure sensitive adhesive is between the backing substrate and a surface of the device. The adhesive article may protect the electronic device during fabrication, shipping, and/or use.

BRIEF DESCRIPTION OF THE DRAWINGS

FIG. 1 shows a partial cross section of an adhesive article 100. The adhesive article comprises a pressure sensitive adhesive 101 prepared by curing a solventless silicone pressure sensitive adhesive composition described herein on a first surface 102 of a film substrate 103. The article 100 further includes a second substrate 104 mounted to an opposing surface 105 of the film substrate 103.

DETAILED DESCRIPTION OF THE INVENTION

The solventless silicone pressure sensitive adhesive composition described herein may comprise:
(A) a polydiorganosiloxane comprising formula (A-1) $(R^1_2R^2SiO)$—$(R^1_2SiO)_a$—$(OSiR^1_2R^2)$, where each $R^1$ is independently selected from the group consisting of a monovalent hydrocarbon group free of terminal aliphatic unsaturation and a monovalent halogenated hydrocarbon group free of terminal aliphatic unsaturation, each $R^2$ is an independently selected monovalent hydrocarbon group with terminal aliphatic unsaturation, and subscript a has an average value of 150 to 2,000;
(B) a branched polyorganosiloxane comprising unit formula (B-1) $(R^1_3SiO_{1/2})_g(R^1_2R^2SiO_{1/2})_h(R^1_2SiO_{2/2})_i(SiO_{4/2})_j$, where $R^1$ and $R^2$ are as described above and subscripts g, h, i, and j have average values such that 2≥g≥0, 4≥h≥0, 995≥i≥4, j=1, (g+h)=4, and (g+h+i+j) has a value sufficient to impart a viscosity>170 mPa·s at 25° C. as measured by rotational viscometry to the branched polyorganosiloxane;
where starting materials (A) and (B) are present in amounts sufficient to provide a weight ratio of starting material (B) to starting material (A) (B/A ratio) of 0.2/1 to 20/1;

(C) a polyorganosilicate resin comprising unit formula (C-1) $(R^1_3SiO_{1/2})_m(R^1_2R^2SiO_{1/2})_n(SiO_{4/2})_o$, where $R^1$ and $R^2$ are as described above and subscripts m, n and o have average values such that m≥0, n≥0, o>0, and (m+n)>4, where starting materials (A), (B) and (C) are present in amounts sufficient to provide a weight ratio of amount of starting material (C) to combined amounts of starting materials (A) and (B) (resin/polymer, or C/(A+B) ratio) of 0.05/1 to 1.5/1;

(D) >0% to <5%, based on combined weights of all starting materials in the composition, of an olefinic reactive diluent;

(E) a polyorganohydrogensiloxane of unit formula (E-1) $(R^1_3SiO_{1/2})_p(R^1_2SiO_{2/2})_q(R^1SiO_{3/2})_r(SiO_{4/2})_s(R^1HSiO_{2/2})_t$ $(R^1_2HSiO_{1/2})_u$, where $R^1$ is as described above, and subscripts p, q, r, s, t, and u have values such that p≥0, q≥0, r≥0, s≥0, t≥0, u≥0, (t+u)≥2, and a quantity (p+q+r+s+t+u) is sufficient to provide the polyorganohydrogensiloxane with a degree of polymerization of 5 to 100; and (F) a hydrosilylation reaction catalyst in an amount sufficient to provide 1 to 1000 ppm of platinum group metal based on combined weights of all starting materials in the composition; and where the starting materials are present in amounts such that a molar ratio of silicon bonded hydrogen atoms to terminally aliphatically unsaturated groups (SiH/Vi) ratio is 0.5/1 to 50/1 based on combined molar amounts of all starting materials in the composition. The solventless silicone pressure sensitive adhesive composition may optionally further comprise one or both of (G) an anchorage additive and (H) a hydrosilylation reaction inhibitor.

(A) Polydiorganosiloxane with Aliphatic Unsaturation

Starting material (A) in the solventless silicone pressure sensitive adhesive composition described herein is a polydiorganosiloxane having a monovalent hydrocarbon group with terminal aliphatic unsaturation. Starting material (A) comprises formula (A-1) $(R^1_2R^2SiO)-(R^1_2SiO)_a-(OSiR^1_2R^2)$, where each $R^1$ is independently selected from the group consisting of a monovalent hydrocarbon group free of terminal aliphatic unsaturation and a monovalent halogenated hydrocarbon group free of terminal aliphatic unsaturation, each $R^2$ is an independently selected monovalent hydrocarbon group with terminal aliphatic unsaturation, and subscript a has an average value of 150 to 2,000. Suitable monovalent hydrocarbon groups and monovalent halogenated hydrocarbon groups for $R^1$ are as defined below. Alternatively, each $R^1$ may be an alkyl group, a cycloalkyl group, an aryl group or an aralkyl group. Alternatively, each $R^1$ may be an alkyl group or an aryl group. Alternatively, each $R^1$ may be methyl or phenyl. Each $R^2$ may be an alkenyl group or an alkynyl group as defined below. Alternatively, each $R^2$ may be an alkenyl group selected from vinyl, allyl, and hexenyl. Alternatively, subscript a may be 150 to 1,000. Alternatively, subscript a may have a value sufficient to impart a viscosity of 400 mPa·s to 100,000 mPa·s to the polydiorganosiloxane for starting material (A). Viscosity is measured according to technique described in the Reference Examples herein below. Alternatively, subscript a may have a value sufficient to impart viscosity of 450 mPa·s to <100,000 mPa·s, and alternatively 450 mPa·s to 70,000 mPa·s to starting material (A).

Starting material (A) may comprise a polydiorganosiloxane such as

A-2) dimethylvinylsiloxy-terminated polydimethylsiloxane,

A-3) dimethylvinylsiloxy-terminated poly(dimethylsiloxane/methylphenylsiloxane), A-4) dimethylvinylsiloxy-terminated poly(dimethylsiloxane/diphenylsiloxane), A-5) phenyl,methyl,vinyl-siloxy-terminated polydimethylsiloxane, A-6) dimethylhexenylsiloxy-terminated polydimethylsiloxane, A-7) a combination of two or more of A-2), A-3), A-4), A-5), and A-6). Methods of preparing polydiorganosiloxanes suitable for use as starting material (A), such as hydrolysis and condensation of the corresponding organohalosilanes or equilibration of cyclic polydiorganosiloxanes, are well known in the art.

Starting materials (A) and (B) are present in amounts sufficient to provide a weight ratio of starting material (B) to starting material (A) (B/A ratio) of 0.2/1 to 20/1, alternatively 0.25/1 to 18/1, and alternatively 0.3/1 to 17/1. The amount of starting material (A) depends on various factors including the type and amount of starting material (B), the type and amount of starting material (C), the concentration of aliphatically unsaturated groups and silicon bonded hydrogen atoms of the starting materials in the composition, and whether an inhibitor is present. However, the amount of starting material (A) may be 4% to 30%, alternatively 9% to 25%, alternatively 13% to 20%, and alternatively 15% to 19%, based on combined weights of all starting materials in the solventless silicone pressure sensitive adhesive composition.

(B) Branched Polyorganosiloxane

Starting material (B) in the solventless silicone pressure sensitive adhesive composition described herein is a branched polyorganosiloxane. Starting material (B) may comprise a Q branched polyorganosiloxane of unit formula (B-1) $(R^1_3SiO_{1/2})_g(R^1_2R^2SiO_{1/2})_h(R^1_2SiO_{2/2})_i(SiO_{4/2})_j$, where $R^1$ and $R^2$ are as described above for starting material (A), and subscripts g, h, i, and j have average values such that 2≥g≥0, 4≥h≥0, 995≥i≥4, j=1, (g+h)=4, and (g+h+i+j) has a value sufficient to impart a viscosity>170 mPa·s measured by rotational viscometer (as described below in the Reference Examples) to the branched polyorganosiloxane. Alternatively, viscosity may be >170 mPa·s to 1000 mPa·s, alternatively >170 to 500 mPa·s, alternatively 180 mPa·s to 450 mPa·s, and alternatively 190 mPa·s to 420 mPa·s. Suitable branched siloxanes for starting material (B-1) are exemplified by those disclosed in U.S. Pat. No. 6,806,339 and U.S. Patent Publication 2007/0289495.

Alternatively, starting material (B) may comprise formula (B-2): $[R^2R^1_2Si-(O-SiR^1_2)_x-]_y-Si-[O-(R^1_2SiO)_vSiR^1_3]_w$, where each $R^1$ in this formula (B-2) is an alkyl group of 1 to 6 carbon atoms, or an aryl group of 6 to 10 carbon atoms, and each $R^2$ in this formula (B-2) is an alkenyl group of 2 to 6 carbon atoms; and subscripts v, w, x, and y have values such that 200≥v≥1, 2≥w≥0, 200≥x≥1, 4≥y≥0, and a quantity (w+y)=4. Alternatively, in this formula (B-2), each $R^1$ is independently selected from the group consisting of methyl and phenyl, and each $R^2$ is independently selected from the group consisting of vinyl, allyl, and hexenyl. Branched polyorganosiloxane suitable for starting material (B) may be prepared by known methods such as heating a mixture comprising a polyorganosilicate resin, and a cyclic polydiorganosiloxane or a linear polydiorganosiloxane, in the presence of a catalyst, such as an acid or phosphazene base, and thereafter neutralizing the catalyst.

Alternatively, starting material (B) may comprise a T branched polyorganosiloxane of unit formula (B-3): $(R^1_3SiO_{1/2})_d(R^2R^1_2SiO_{1/2})_e(R^1_2SiO_{2/2})_m(R^1SiO_{3/2})_n$, where $R^1$ and $R^2$ are as described above, subscript d≥0, subscript e>0, subscript m is 15 to 995, and subscript n>0. Subscript d may be 0 to 10. Alternatively, for subscript d: $12 \geq d \geq 0$; alternatively $10 \geq d \geq 0$; alternatively $7 \geq d \geq 0$; alternatively $5 \geq d \geq 0$; and alternatively $3 \geq d \geq 0$.

Alternatively, subscript $e \geq 1$. Alternatively, subscript $e \geq 3$. Alternatively, for subscript e: $12 \geq e > 0$; alternatively $12 \geq e \geq 3$; alternatively $10 \geq e > 0$; alternatively $7 \geq e > 1$; alternatively $5 \geq e \geq 2$; and alternatively $7 \geq e \geq 3$. Alternatively, for subscript m: $800 \geq m \geq 15$; and alternatively $400 \geq m \geq 15$. Alternatively, subscript $n \geq 1$. Alternatively, subscript n is 1 to 10. Alternatively, for subscript n: $10 \geq h > 0$; alternatively $5 \geq n > 0$; and alternatively $n=1$. Alternatively, subscript n is 1 to 10, alternatively subscript n is 1 or 2. Alternatively, when subscript $n=1$, then subscript e may be 3 and subscript d may be 0. The values for subscript e may be sufficient to provide the silsesquioxane of unit formula (B-3) with an alkenyl content of 0.1% to 1%, alternatively 0.2% to 0.6%, based on the weight of the silsesquioxane. Suitable silsesquioxanes for starting material (B-3) are exemplified by those disclosed in U.S. Pat. No. 4,374,967.

The amount of starting material (B) depends on various factors including the type and amount of starting material (A), the type and amount of starting material (C), the concentration of aliphatically unsaturated groups and silicon bonded hydrogen atoms of the starting materials in the composition, and whether an inhibitor is present. However, the amount of starting material (B) may be 10% to 80%, alternatively 10% to 75%, alternatively 15% to 70%, alternatively 20% to 65%, alternatively 25% to 60%, based on combined weights of all starting materials in the solventless silicone pressure sensitive adhesive composition.

(C) Polyorganosilicate Resin

The polyorganosilicate resin useful as starting material (C) comprises monofunctional units ("M" units) of formula $R^M_3SiO_{1/2}$ and tetrafunctional silicate units ("Q" units) of formula $SiO_{4/2}$, where each $R^M$ is an independently selected monovalent organic group, which may be a monovalent hydrocarbon group or a monovalent halogenated hydrocarbon group as described hereinbelow. Alternatively, in the polyorganosilicate resin, each $R^M$ may be independently selected from the group consisting of $R^1$ and $R^2$ as described herein. Alternatively, each $R^M$ may be selected from the group consisting of alkyl, alkenyl and aryl. Alternatively, each $R^M$ may be selected from methyl, vinyl and phenyl. Alternatively, at least one-third, alternatively at least two thirds of the $R^M$ groups are methyl groups. Alternatively, the M units may be exemplified by $(Me_3SiO_{1/2})$, $(Me_2PhSiO_{1/2})$, and $(Me_2ViSiO_{1/2})$. The polyorganosilicate resin is soluble in solvents such as those described above, exemplified by liquid hydrocarbons, such as benzene, toluene, xylene, and heptane, or in liquid organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups and may comprise neopentamer of formula $Si(O-SiR^M_3)_4$, where $R^M$ is as described above, e.g., the neopentamer may be tetrakis(trimethylsiloxy)silane. $^{29}$Si NMR spectroscopy may be used to measure hydroxyl content and molar ratio of M and Q units, where said ratio is expressed as {M(resin)}/{Q(resin)}, excluding M and Q units from the neopentamer. M:Q ratio represents the molar ratio of the total number of triorganosiloxy groups (M units) of the resinous portion of the polyorganosilicate resin to the total number of silicate groups (Q units) in the resinous portion. M:Q ratio may be 0.5:1 to 1.5:1.

The Mn of the polyorganosilicate resin depends on various factors including the types of hydrocarbon groups represented by $R^M$ that are present. The Mn of the polyorganosilicate resin refers to the number average molecular weight measured using GPC, when the peak representing the neopentamer is excluded from the measurement. The Mn of the polyorganosilicate resin may be greater than 3,000 Da, alternatively >3,000 to 8,000 Da. Alternatively, Mn of the polyorganosilicate resin may be 3,500 to 8,000 Da.

U.S. Pat. No. 8,580,073 at col. 3, line 5 to col. 4, line 31, and U.S. Patent Publication 2016/0376482 at paragraphs [0023] to [0026] are hereby incorporated by reference for disclosing MQ resins, which are suitable polyorganosilicate resins for use in the solventless silicone pressure sensitive adhesive composition described herein. The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M_3SiX^1$, where $R^M$ is as described above and $X^1$ represents a hydrolyzable substituent such as that described above for $X^3$. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above typically contain silicon bonded hydroxyl groups, i.e., of formulae, $HOSi_{3/2}$ and/or $HOR^M_2SiO_{1/2}$. The polyorganosilicate resin may comprise up to 2% of silicon bonded hydroxyl groups, as measured by FTIR spectroscopy. For certain applications, it may be desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group. Silanes containing hydrolyzable groups may be added in molar excess of the quantity required to react with the silicon bonded hydroxyl groups on the polyorganosilicate resin.

In one embodiment, the polyorganosilicate resin may further comprises 2% or less, alternatively 0.7% or less, and alternatively 0.3% or less, and alternatively 0.3% to 0.8% of units represented by formula $XSiO_{3/2}$ and/or $XR^M_2SiO_{1/2}$ where $R^M$ is as described above, and X represents a hydrolyzable substituent, as described above for $X^3$. The concentration of silanol groups present in the polyorganosiloxane may be determined using FTIR spectroscopy.

Alternatively, the polyorganosilicate resin may have terminal aliphatically unsaturated groups. The polyorganosilicate resin having terminal aliphatically unsaturated groups may be prepared by reacting the product of Daudt, et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare such resin.

Alternatively, the polyorganosilicate resin for starting material (C) may comprise unit formula (C-1): $(R^1_3SiO_{1/2})_m(R^1_2R^2SiO_{1/2})_n(SiO_{4/2})_o$, where $R^1$ and $R^2$ are as described above and subscripts m, n and o have average values such that m≥0, n≥0, o>0, and (m+n)>4. Alternatively, starting material (C) comprises unit formula: $(R^1_3SiO_{1/2})_z$ $(SiO_{4/2})_o$, where each $R^1$ is independently selected from the group consisting of methyl and phenyl, subscript o is as described above, and subscript z>4.

The exact amount of starting material (C) depends on various factors including the type and amount of starting material (A), the type and amount of starting material (B), the concentration of aliphatically unsaturated groups and silicon bonded hydrogen atoms of the starting materials in the composition, and whether an inhibitor is present. However, starting materials (A), (B) and (C) are present in amounts sufficient to provide a weight ratio of amount of starting material (C) to combined amounts of starting materials (A) and (B) (resin/polymer, or C/(A+B) ratio) of 0.05/1 to 1.5/1; alternatively 0.1/1 to 1.0/1, and alternatively 0.1/1 to 0.9/1. Alternatively, starting material (C) may be present in an amount of 10% to 60%, alternatively 12% to 51%, alternatively 25% to 40%, based on combined weights of all starting materials in the solventless silicone pressure sensitive adhesive composition.

(D) Olefinic Reactive Diluent

Starting material (D) is an optional olefinic reactive diluent. The olefinic reactive diluent comprises a hydrocarbon compound of 8 to 18 carbon atoms and at least one aliphatic unsaturation per molecule. The olefinic reactive diluent may be linear. The reactive diluent may be linear or branched. The aliphatic unsaturation may be pendant or terminal. Examples of reactive diluents suitable for starting material (D) include (D-1) n-dodecene; (D-2) n-tetradecene; (D-3) n-hexadecene; (D-4) n-octadecene; (D-5) any branched isomer of any of (D-1), (D-2), (D-3), and/or (D-4); and (D-6) combinations of two or more of (D-1), (D-2), (D-3), (D-4), and/or (D-5). The reactive diluent may have a double bond at a terminal position. Alternatively, starting material (D) may comprise 12 to 14 carbon atoms. Alternatively, starting material (D) may comprise n-tetradecene.

The amount of starting material (D) depends on various factors including the selection and amounts of starting materials (A) and (B). However, the amount of starting material (D) may be greater than 0% to less than 5%, alternatively 0.5% to <5%, alternatively 1% to 3%, alternatively 1.2% to 3%, alternatively 1.9% to 2.6%, and alternatively 2% to 2.5%, based on combined weights of all starting materials in the solventless silicone pressure sensitive adhesive composition.

(E) Polyorganohydrogensiloxane

Starting material (E) is a polyorganohydrogensiloxane. Starting material (E) acts as a crosslinker in the pressure sensitive adhesive composition. Starting material (E) may have at least 2, alternatively least 3, silicon bonded hydrogen atoms per molecule.

Starting material (E) may comprise a polyorganohydrogensiloxane of unit formula (E-1) $(R^1_3SiO_{1/2})_p(R^1_2SiO_{2/2})_q(R^1SiO_{3/2})_r(SiO_{4/2})_s(R^1HSiO_{2/2})_t(R^1_2HSiO_{1/2})_u$, where $R^1$ is as described above, and subscripts p, q, r, s, t, and u have values such that p≥0, q≥0, r≥0, s≥0, t≥0, u≥0, (t+u)≥2, and a quantity (p+q+r+s+t+u) is sufficient to provide the polyorganohydrogensiloxane with a degree of polymerization of 5 to 100, alternatively 10 to 60. Alternatively, starting material (E) may comprise a polyorganohydrogensiloxane of unit formula (E-2): $(R^1_3SiO_{1/2})_2$ $(R^1_2SiO_{2/2})_{aa}(R^1HSiO_{2/2})_{bb}$, where each $R^1$ is selected from the group consisting of methyl and phenyl, subscript aa is 0 to 30, and subscript bb is 5 to 50.

Alternatively, starting material (E) may comprise a polyorganohydrogensiloxane of

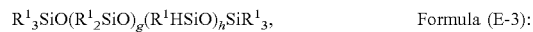  Formula (E-3):

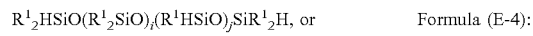  Formula (E-4):

both (E-3) and (E-4).

In formulae (E-3) and (E-4) above, $R^1$ is as described above. Subscript g has an average value of 0 to 2000, subscript h has an average value of 2 to 2000, subscript i has an average value of 0 to 2000, and subscript j has an average value of 0 to 2000.

Polyorganohydrogensiloxanes for starting material (E) are exemplified by:

(E-4-a) dimethylhydrogensiloxy-terminated polydimethylsiloxane, (E-4-b) dimethylhydrogensiloxy-terminated poly(dimethylsiloxane/methylhydrogensiloxane), (E-4-c) dimethylhydrogensiloxy-terminated polymethylhydrogensiloxane, (E-3-a) trimethylsiloxy-terminated poly(dimethylsiloxane/methylhydrogensiloxane), (E-3-b) trimethylsiloxy-terminated polymethylhydrogensiloxane, and (E5) a combination of two or more of (E-4-a), (E-4-b), (E-4-c), (E-3-a), and (E-3-b).

Methods of preparing organohydrogenpolysiloxanes, such as hydrolysis and condensation of organohalosilanes, are well known in the art.

The amount of starting material (E) depends on various factors including the concentration of aliphatically unsaturated monovalent hydrocarbon groups in the composition and the SiH content of starting material (E). However, the amount of starting material (E) may be 1% to 10%, alternatively 3% to 8%, based on combined weights of all starting materials in the composition.

(F) Hydrosilylation Reaction Catalyst

Hydrosilylation reaction catalysts are known in the art and are commercially available. Hydrosilylation reaction catalysts include platinum group metal catalysts. The hydrosilylation reaction catalyst can be a metal selected from platinum, rhodium, ruthenium, palladium, osmium, and iridium. Alternatively, the hydrosilylation catalyst may be a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3- tetramethyldisiloxane complexes with platinum (Karstedt's Catalyst). These complexes may be microencapsulated in a resin matrix. Alternatively, a hydrosilylation catalyst may comprise 1,3-diethenyl-1,1,3,3-tetramethyldisiloxane complex with platinum. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation catalysts and methods of preparing them are known in the art, as exemplified in U.S. Pat. Nos. 4,766,176 and 5,017,654.

The amount of catalyst used herein will depend on various factors including the selection of starting materials (A), (B), (C), and (E) and their respective contents of silicon bonded hydrogen atoms and terminally aliphatically unsaturated groups, and whether an inhibitor is present, however, the amount of catalyst is sufficient to catalyze hydrosilylation reaction of SiH and aliphatically unsaturated groups, alternatively the amount of catalyst is sufficient to provide 1 ppm to 1000 ppm of the platinum group metal, alternatively 5 ppm to 100 ppm, based on combined weights of all starting materials in the solventless silicone pressure sensitive adhesive composition.

(G) Anchorage Additive

Starting material (G) is an anchorage additive that may optionally be included in the solventless silicone pressure sensitive adhesive composition. Without wishing to be bound by theory, it is thought that the anchorage additive will facilitate bonding to a substrate by a pressure sensitive adhesive prepared by curing the solventless silicone pressure sensitive adhesive composition described herein. However, the presence of the anchorage additive will not detrimentally affect the desired peel force allowing the pressure sensitive adhesive to be removed from an electronic device without damaging the device or leaving significant residue.

Suitable anchorage additives for starting material (G) include silane coupling agents such as methyltrimethoxysilane, vinyltrimethoxysilane, allyltrimethoxysilane, 3-methacryloxypropyltrimethoxysilane, 3-aminopropyltrimethoxysilane, N-(2-aminoethyl)-3-aminopropyltrimethoxysilane, bis(trimethoxysilyl)propane, and bis(trimethoxysilylhexane; and mixtures or reaction mixtures of said silane coupling agents. Alternatively, the anchorage additive may be tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, allyltriethoxysilane, 3-glycidoxypropyltrimethoxysilane, 3-glycidoxypropyltriethoxysilane, or 3-methacryloxypropyl trimethoxysilane.

Exemplary anchorage additives are known in the art, such as in U.S. Patent Publication 2012/0328863 at paragraph [0091] and U.S. Patent Publication 2017/0233612 at paragraph [0041]. Anchorage additives are commercially available. For example, SYL OFF® 297 is available from Dow Silicones Corporation of Midland, Mich., USA. Other exemplary anchorage additives include (G-1) vinyltriacetoxysilane, (G-2) glycidoxypropyltrimethoxysilane, and (G-3) a combination of (G-1) and (G-2). This combination (G-3) may be a mixture and/or a reaction product.

The amount of anchorage additive depends on various factors including the type of substrate to which the solventless silicone pressure sensitive adhesive will be applied. However, the amount of anchorage additive may be 0 to 5%, alternatively 1% to 5%, alternatively 1% to 3%, and alternatively 1.9% to 2.1%, based on combined weights of all starting materials in the solventless silicone pressure sensitive adhesive composition.

(H) Inhibitor

The solventless silicone pressure sensitive adhesive composition may optionally further comprise (H) a hydrosilylation reaction inhibitor. Inhibitors for hydrosilylation reactions are exemplified by (H1) acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination of two or more thereof; (H2) cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination of two or more thereof; (H3) ene-yne compounds such as 3-methyl-3-penten-1-yne, 3,5-dimethyl-3-hexen-1-yne, and a combination of two or more thereof; (H4) triazoles such as benzotriazole; (H5) phosphines; (H6) mercaptans; (H7) hydrazines; (H8) amines, such as tetramethyl ethylenediamine; (H9) fumarates such as dialkyl fumarates, dialkenyl fumarates, dialkoxyalkyl fumarates, and a combination of two or more thereof; (H10) maleates such as diallyl maleate; (H11) nitriles; (H12) ethers; (H13) carbon monoxide; (H14) alcohols such as benzyl alcohol; (H15) a silylated acetylenic compound; and a combination of two or more of (H1) to (H15).

The silylated acetylenic compound may be used to reduce or minimize coloring (e.g., yellowing) of the pressure sensitive adhesive prepared by curing the solventless silicone pressure sensitive adhesive composition described herein; as compared to a pressure sensitive adhesive that does not contain a silylated acetylenic compound or that contains an organic acetylenic alcohol, such as those described above. The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy) dimethylsilane, bis(3-methyl-1-butyn-3-oxy)silanemethylvinylsilane, bis((1,1-dimethyl-2-propynyl)oxy) dimethylsilane, methyl(tris(1,1-dimethyl-2-propynyloxy)) silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy) trimethylsilane, (3-phenyl-1-butyn-3-oxy) diphenylmethylsilane, (3-phenyl-1-butyn-3-oxy) dimethylphenylsilane, (3-phenyl-1-butyn-3-oxy) dimethylvinylsilane, (3-phenyl-1-butyn-3-oxy) dimethylhexenylsilane, (cyclohexyl-1-ethyn-1-oxy) dimethylhexenylsilane, (cyclohexyl-1-ethyn-1-oxy) dimethylvinylsilane, (cyclohexyl-1-ethyn-1-oxy) diphenylmethylsilane, (cyclohexyl-1-ethyn-1-oxy) trimethylsilane, and combinations thereof. Alternatively, the inhibitor is exemplified by methyl(tris(1,1-dimethyl-2-propynyloxy))silane, ((1,1-dimethyl-2-propynyl)oxy)trimethylsilane, or a combination thereof. The silylated acetylenic compound useful as inhibitor may be prepared by methods known in the art, such as silylating an acetylenic alcohol described above by reacting it with a chlorosilane in the presence of an acid receptor.

The amount of inhibitor will depend on various factors including the desired pot life of the starting materials, the temperature selected for curing the solventless silicone pressure sensitive adhesive composition, the particular inhibitor used, and the selection and amounts other starting materials used. However, when present, the amount of inhibitor may be 0% to 5%, alternatively 0.05% to 1%, alternatively 0.01% to 0.5%, and alternatively 0.0025% to 0.025%, based on combined weights of all starting materials in the solventless silicone pressure sensitive adhesive composition.

In the solventless silicone pressure sensitive adhesive composition, the starting materials are selected and present in amounts such that a molar ratio of silicon bonded hydrogen atoms to terminally aliphatically unsaturated groups (SiH/Vi) ratio is 0.5/1 to 50/1, alternatively 1.5/1 to 10/1, alternatively 3/1 to 10/1, and alternatively 8/1 to 10/1, based on combined molar amounts of all starting materials in the solventless silicone pressure sensitive adhesive composition.

In the solventless silicone pressure sensitive adhesive composition, the starting materials are selected such that upon mixing the starting materials, the solventless silicone pressure sensitive adhesive composition has a viscosity of 300 mPa·s to 5,000 mPa·s as measured by the rotational viscometry method described in the Reference Examples below. Without wishing to be bound by theory, it is thought that a viscosity less than 300 mPa·s may cause the solventless silicone pressure sensitive adhesive composition to flow on a surface of a backing substrate to which the solventless silicone pressure sensitive adhesive composition is applied before curing, which may result in an ununiformed adhesive coverage on substrates and poor flatness of an adhesive surface of the pressure sensitive adhesive prepared by curing the solventless silicone pressure sensitive adhesive composition (e.g., the surface opposite the backing substrate on which the solventless silicone pressure sensitive adhesive composition is applied and cured). Without wishing to be bound by theory, it is thought that if viscosity of the solventless silicone pressure sensitive adhesive composition exceeds 5,000 mPa·s, then the solventless silicone pressure sensitive adhesive composition may not be suitable for use with some coating machines, such as Gravure or Comma.

Method of Making Solventless Silicone Pressure Sensitive Adhesive Composition

The solventless silicone pressure sensitive adhesive composition can be prepared by a method comprising combining all starting materials by any convenient means such as mixing at ambient or elevated temperature. Starting material (H) the inhibitor may be added before (F) the hydrosilylation reaction catalyst, for example, when the solventless silicone pressure sensitive adhesive composition will be prepared at elevated temperature and/or the solventless silicone composition will be prepared as a one part composition.

The method may further comprise delivering one or more starting materials in a solvent (e.g., (C) the polyorganosilicate resin and/or (F) the hydrosilylation reaction catalyst), which may be dissolved in a solvent when combined with one or more of the other starting materials in the composition, and thereafter all or substantially all of the solvent may be removed by conventional means such as stripping and/or distillation, optionally with reduced pressure). One skilled in the art would understand that the resulting solventless silicone pressure sensitive adhesive composition contains no solvent or may contain trace amounts of residual solvent from delivery of a starting material, however, a solvent (e.g., organic solvent such as toluene or non-functional polydiorganosiloxane) is not intentionally added to the solventless silicone pressure sensitive adhesive composition.

Alternatively, the solventless silicone pressure sensitive adhesive composition may be prepared as a multiple part composition, for example, when the solventless silicone pressure sensitive adhesive composition will be stored for a long period of time before use, e.g., up to 6 hours before coating the solventless silicone pressure sensitive adhesive composition on a substrate. In the multiple part composition, starting material (F) the hydrosilylation reaction catalyst is stored in a separate part from any starting material having a silicon bonded hydrogen atom, for example (E) the polyorganohydrogensiloxane, and the parts are combined shortly before use of the solventless silicone pressure sensitive adhesive composition.

For example, a multiple part composition may be prepared by combining starting materials comprising at least some of (A) the polydiorganosiloxane having a monovalent hydrocarbon group with terminal aliphatic unsaturation, (E) the polyorganohydrogensiloxane, and optionally one or more other additional starting materials described above to form a base part, by any convenient means such as mixing. A curing agent may be prepared by combining starting materials comprising at least some of (A) the polydiorganosiloxane having a monovalent hydrocarbon group with terminal aliphatic unsaturation, (F) the hydrosilylation reaction catalyst, and optionally one or more other additional starting materials described above by any convenient means such as mixing. The starting materials may be combined at ambient or elevated temperature. Starting material (H) the hydrosilylation reaction inhibitor may be included in one or more of the base part, the curing agent part, or a separate additional part. Starting material (G) the anchorage additive may be added to the base part, or may be added as a separate additional part. Starting material (C) the polyorganosilicate resin may be added to the base part, the curing agent part, or a separate additional part. Starting material (B) the branched polyorganosiloxane may be added to the base part. Starting material (D) the reactive diluent may be added to the base part. Alternatively, starting materials (B) and (D) may be added in a separate additional part. When a two part composition is used, the weight ratio of amounts of base part to curing agent part may range from 1:1 to 10:1. The solventless silicone pressure sensitive adhesive composition will cure via hydrosilylation reaction to form a pressure sensitive adhesive.

The method described above may further comprise one or more additional steps. The solventless silicone pressure sensitive adhesive composition prepared as described above may be used to form an adhesive article, e.g., a pressure sensitive adhesive (prepared by curing the solventless silicone pressure sensitive adhesive composition described above) on a substrate. The method may, therefore, further comprise comprises applying the pressure sensitive adhesive composition to a substrate.

Applying the pressure sensitive adhesive composition to the substrate can be performed by any convenient means. For example, the solventless silicone pressure sensitive adhesive curable composition may be applied onto a substrate by gravure coater, comma coater, offset coater, offset-gravure coater, roller coater, reverse-roller coater, air-knife coater, or curtain coater.

The substrate can be any material that can withstand the curing conditions (described below) used to cure the solventless silicone pressure sensitive adhesive composition to form the pressure sensitive adhesive on the substrate. For example, any substrate that can withstand heat treatment at a temperature equal to or greater than 120° C., alternatively 150° C. is suitable. Examples of materials suitable for such substrates including plastic films such as polyimide (PI), polyetheretherketone (PEEK), polyethylene naphthalate (PEN), liquid-crystal polyarylate, polyamideimide (PAI), polyether sulfide (PES), polyethylene terephthalate (PET), polyethylene (PE), or polypropylene (PP). Alternatively, the substrate may be a metal foil such as aluminum foil or copper foil. The thickness of the substrate is not critical, however, the thickness may be 5 micrometers to 300 micrometers.

To improve bonding of the pressure sensitive adhesive to the substrate, the method for forming the adhesive article may optionally further comprise treating the substrate before applying the solventless silicone pressure sensitive adhesive composition. Treating the substrate may be performed by any convenient means, such as applying a primer, or subjecting the substrate to corona-discharge treatment, etching, or plasma treatment before applying the solventless silicone pressure sensitive adhesive composition to the substrate.

Curing the solventless silicone pressure sensitive adhesive composition may be performed by heating at a temperature of 80° C. to 200° C., alternatively 90° C. to 180° C., alternatively 100° C. to 160° C., and alternatively 110° C. to 150° C. for a time sufficient to cure the solventless silicone pressure sensitive adhesive composition (e.g., for 30 seconds to an hour, alternatively 1 to 5 minutes). If cure speed needs to be increased or the process oven temperatures lowered, the catalyst level can be increased. This forms a pressure sensitive adhesive on the substrate. Curing may be performed by placing the substrate in an oven. The amount of the solventless silicone pressure sensitive adhesive composition to be applied to the substrate depends on the specific application, however, the amount may be sufficient such that after curing thickness of the pressure sensitive adhesive may be 5 micrometers to 100 micrometers, and for protective film the thickness may be 6 micrometers to 50 micrometers, alternatively 8 micrometers to 40 micrometers, and alternatively 10 to 30 micrometers.

The method described herein may optionally further comprise applying a removable release liner to the pressure sensitive adhesive opposite the substrate, e.g., to protect the pressure sensitive adhesive before use of the adhesive article. The release liner may be applied before, during or after curing the solventless silicone pressure sensitive adhesive composition; alternatively after curing.

The adhesive article (e.g., protective film) prepared as described above is suitable for use in electronic device processing. For example, in one embodiment, the adhesive article may be used in electronic device fabrication processes, such as a flexible OLED device fabrication process, as a protective film with low adhesion, removability with low peeling force, high adhesion stability, and/or low migration (no or minimal transfer of pressure sensitive adhesive to the electronic device).

For example, a method for fabricating an electronic device, exemplified by a flexible OLED device, may include forming an OLED module on a surface of a substrate, e.g., a passivation layer on a surface of the OLED module opposite the substrate, and applying a protective film (i.e., an adhesive article comprising the pressure sensitive adhesive prepared as described herein) to a surface of the passivation layer opposite the OLED module. The method further comprises removing the protective film after processing. The protective film may be removed without damaging the electronic device after processing.

In an alternative embodiment, the adhesive article prepared as described above may be used for surface protection of an electronic device, such as screen or other surface protection during shipment of the device, such as a smartphone or tablet, or at an end user for screen protection of such a device. The pressure sensitive adhesive and substrate selected are typically transparent for screen protection applications. The adhesive article may be removed without damaging the electronic device after shipping.

EXAMPLES

These examples are intended to illustrate some embodiments of the invention and should not be interpreted as limiting the scope of the invention set forth in the claims. The starting materials in Table 1 were used in the examples herein.

TABLE 1

| Starting Material | Description | Viscosity (mPa·s) | % vinyl | % SiH | DP |
|---|---|---|---|---|---|
| L-1 | α,ω-vinyl terminated polydimethylsiloxane | 450 | 0.43 | N/A | 164 |
| L-2 | α,ω-vinyl terminated polydimethylsiloxane | 12,000 | 0.13 | N/A | 552 |
| L-3 | α,ω-vinyl terminated polydimethylsiloxane | 25,000 | 0.07 | N/A | 970 |
| L-4 | α,ω-vinyl-terminated poly(dimethylsiloxane/methylvinylsiloxane) copolymer | 70,000 | 0.29 | N/A | NR |
| QB1 | Si—[(Me$_2$SiO$_{2/2}$)$_{57}$(ViMe$_2$SiO$_{1/2}$)]$_4$ | 420 | 0.60 | N/A | N/A |
| QB2 | Si—[(Me$_2$SiO$_{2/2}$)$_x$(ViMe$_2$SiO$_{1/2}$)]$_4$, where subscript x has a value sufficient to provide QB2 with the viscosity of 190 | 190 | 0.90 | N/A | N/A |
| 0B3 | Si—[(Me$_3$SiO$_{1/2}$)$_a$(ViMe$_2$SiO$_{1/2}$)$_b$(Me$_2$SiO$_{2/2}$)$_c$]$_4$, where subscript a > 0, subscript b > 0, and subscript c > 0 | 400 | 0.47 | N/A | N/A |
| QB4 | Si—[(Me$_2$SiO$_{2/2}$)$_{30}$(ViMe$_2$SiO$_{1/2}$)]$_4$ | 130 | 1.45 | N/A | N/A |
| QB5 | Si—[(Me$_3$SiO$_{1/2}$)$_a$(ViMe$_2$SiO$_{1/2}$)$_b$(Me$_2$SiO$_{2/2}$)$_c$]$_4$ where subscript a > 0, subscript b > 0, and subscript c > 0 | 170 | 0.81 | N/A | N/A |
| MQ1 | a resin comprising units of formula (Me$_3$SiO$_{1/2}$)$_d$(SiO$_{4/2}$)$_e$, where subscripts d and e are sufficient to provide the resin with Mn = 4100 g/mol; Mw = 10200 g/mol measured by GPC M/Q ratio: M (Me$_3$) % = 50% by mole and Q % = 50% by mole measured by $^{29}$Si NMR | N/A | N/A | N/A | NR |

TABLE 1-continued

| Starting Material | Description | Viscosity (mPa·s) | % vinyl | % SiH | DP |
|---|---|---|---|---|---|
| D1 | tetradecene, n-$C_{12}H_{25}CH=CH_2$ | N/A | N/A | N/A | N/A |
| XL-1 | α,ω-trimethylsiloxy-terminated, polymethylhydrogensiloxane | 30 | N/A | 1.62 | 52 |
| XL-2 | α,ω-trimethylsiloxy-terminated, poly(dimethylsiloxane/methylhydrogensiloxane) copolymer | 5 | N/A | 0.76 | 10 |
| F1 | Karstedt's catalyst | NR | NR | NR | NR |
| G3 | reaction product of 50% vinyltriacetoxysilane and NR 50% glycidoxypropyltrimethoxysilane having terminal vinyl groups | 0.012 | N/A | N/A | |

In Table 1, 'N/A' means not applicable, and 'NR' means not reported.

Reference Example—General Procedure for Preparing Solventless Silicone Pressure Sensitive Adhesive Compositions Samples of Solventless Silicone Pressure Sensitive Adhesive Compositions were prepared by combining the starting material as shown in each column of Tables 2, 3 and 4. First, (C) a polyorganosilicate resin (MQ1) was dissolved in xylenes with a nonvolatiles of 66% by mass. Then, (A) a vinyl terminated polydiorganosiloxane (L-1, L-2, L-3, and/or L-4), (B) a branched polyorganosiloxane, (QB-1, QB-2, QB-3, QB-4 and/or QB-5) and solvent contained (C) were combined and thoroughly blended. The resulting mixture was then stripped at 130° C. and full vacuum for 1 hour to remove volatile materials. The mixture was then cooled to 100° C. and starting material (D1) tetradecene and starting material (E) a polyorganohydrogensiloxane crosslinker (XL-1 and/or XI-2) were added and blended into the mixture. The mixture was then cooled to RT and starting material (H) a hydrosilylation reaction inhibitor was thoroughly blended into the mixture. Finally, starting material (F1) Karstedt's catalyst was added and mixed until homogeneous. An anchorage additive (G3) shown in the table above, was also added in the amounts shown in the tables.

The resulting solventless silicone pressure sensitive adhesive composition samples were coated on 50 micrometer thick PET film on corona treated side. The sample was manually coated onto PET film using a 4-sided applicator (gap available: 30, 60, 90, 120 micrometer; 30 micrometer gap was used for all samples). After coated, the sheet was then cured at 140° C. for 2 minutes. The thickness of the cured adhesive coating is between 20-30 micrometer.

The resulting adhesive articles were then tested according to the techniques in Reference Example 2. The results are reported in Tables 2, 3, and 4, below.

TABLE 2

|  | Ex.-1 | Ex.-2 | Ex.-3 | Comp. Ex.-1 | Comp. Ex.-2 | Ex.-4 | Ex.-5 | Ex-6 | Comp. Ex.-3 | Comp. Ex.-4 |
|---|---|---|---|---|---|---|---|---|---|---|
| L-1 | 21.86 | 21.57 | 22.07 | 20.95 | 21.68 | 20.33 | 20.07 | 20.52 | 19.50 | 20.17 |
| L-2 | 0 | 0 | 0 | 0 | 0 | 0 | 0 | 0 | 0 | 0 |
| L-3 | 0 | 0 | 0 | 0 | 0 | 0 | 0 | 0 | 0 | 0 |
| L-4 | 0 | 0 | 0 | 0 | 0 | 0 | 0 | 0 | 0 | 0 |
| QB-1 | 22.49 | 0 | 0 | 0 | 0 | 27.89 | 0 | 0 | 0 | 0 |
| QB-2 | 0 | 22.19 | 0 | 0 | 0 | 0 | 27.52 | 0 | 0 | 0 |
| QB-3 | 0 | 0 | 22.70 | 0 | 0 | 0 | 0 | 28.15 | 0 | 0 |
| QB-4 | 0 | 0 | 0 | 21.55 | 0 | 0 | 0 | 0 | 26.74 | 0 |
| QB-5 | 0 | 0 | 0 | 0 | 22.30 | 0 | 0 | 0 | 0 | 27.66 |
| MQ1 | 39.66 | 39.14 | 40.03 | 38.00 | 39.33 | 36.88 | 36.41 | 37.23 | 35.37 | 36.58 |
| XL-1 | 3.37 | 4.62 | 2.45 | 7.24 | 4.17 | 2.89 | 4.13 | 1.98 | 6.74 | 3.68 |
| XL-2 | 4.92 | 4.86 | 4.97 | 4.72 | 4.88 | 4.58 | 4.53 | 4.63 | 4.40 | 4.55 |
| D1 | 3.06 | 3.02 | 3.09 | 2.93 | 3.03 | 2.84 | 2.81 | 2.87 | 2.73 | 2.82 |
| F1 | 2.32 | 2.31 | 2.32 | 2.30 | 2.31 | 2.29 | 2.28 | 2.29 | 2.28 | 2.29 |
| G3 | 2.32 | 2.31 | 2.32 | 2.30 | 2.31 | 2.29 | 2.28 | 2.29 | 2.28 | 2.29 |
| Viscosity (cP) | 2288 | 1500 | 3552 | 862 | 1203 | 1038 | 724 | 1580 | 503 | 645 |
| C/(A + B) ratio | 0.89 | 0.89 | 0.89 | 0.89 | 0.89 | 0.76 | 0.76 | 0.76 | 0.76 | 0.76 |
| B/A Ratio | 1.03 | 1.03 | 1.03 | 1.03 | 1.03 | 1.37 | 1.37 | 1.37 | 1.37 | 1.37 |
| SiH/Vi Ratio | 10 | 10 | 10 | 10 | 10 | 8 | 8 | 8 | 8 | 8 |
| Initial Adhesion (g/inch) | 22.57 | 22.1 | 35.2 | 14.4 | 20.8 | 18.8 | 12.2 | 13.6 | 9.3 | 11.9 |
| 1 d aged adhesion (g/inch) | 65.07 | 60.4 | 111.5 | 31.1 | 54.6 | 58.8 | 31.4 | 42.2 | 24.9 | 32.3 |
| 3 d aged adhesion (g/inch) | 62.5 | 46.2 | 97.0 | 30.0 | 47.7 | 59.3 | 30.6 | 38.2 | 22.1 | 29.8 |

TABLE 2-continued

|  | Ex.-1 | Ex.-2 | Ex.-3 | Comp. Ex.-1 | Comp. Ex.-2 | Ex.-4 | Ex.-5 | Ex-6 | Comp. Ex.-3 | Comp. Ex.-4 |
|---|---|---|---|---|---|---|---|---|---|---|
| Adhesion increase ratio 1 (1 d aged/Initial) | 2.88 | 2.73 | 3.17 | 2.17 | 2.63 | 3.13 | 2.57 | 3.10 | 2.63 | 2.71 |
| Adhesion increase ratio 2 (3 d aged/Initial) | 2.77 | 2.10 | 2.75 | 2.09 | 2.30 | 3.16 | 2.50 | 2.81 | 2.30 | 2.50 |
| Coating appearance | 9 | 9 | 8 | 4 | 2 | 8 | 8 | 8 | 2 | 2 |

The examples and comparative examples in Table 2 show the effect of changing the viscosity of starting material (B) the branched polyorganosiloxane.

TABLE 3

|  | Ex.-1 | Ex.-4 | Ex-7 | Comp. Ex.-5 | Comp. Ex.-6 | Comp. Ex.-7 | Comp. Ex.8 | Comp. Ex.-9 |
|---|---|---|---|---|---|---|---|---|
| L-1 | 21.86 | 20.34 | 22.23 | 44.82 | 48.72 | 22.49 | 22.02 | 22.52 |
| L-2 | 0 | 0 | 0 | 0 | 0 | 23.14 | 0 | 0 |
| L-3 | 0 | 0 | 11.44 | 0 | 0 | 0 | 22.66 | 0 |
| L-4 | 0 | 0 | 0 | 0 | 0 | 0 | 0 | 23.16 |
| QB-1 | 22.49 | 27.89 | 11.44 | 0 | 0 | 0 | 0 | 0 |
| MQ1 | 39.66 | 36.89 | 40.34 | 40.08 | 37.27 | 40.80 | 39.96 | 40.85 |
| XL-1 | 3.37 | 2.89 | 1.82 | 2.39 | 1.93 | 0.65 | 2.72 | 0.57 |
| XL-2 | 4.93 | 4.58 | 5.01 | 4.98 | 4.63 | 5.07 | 4.96 | 5.07 |
| D1 | 3.06 | 2.84 | 3.11 | 3.09 | 2.87 | 3.15 | 3.08 | 3.15 |
| F1 | 2.32 | 2.29 | 2.29 | 2.32 | 2.29 | 2.35 | 2.29 | 2.32 |
| G3 | 2.32 | 2.29 | 2.33 | 2.32 | 2.29 | 2.36 | 2.31 | 2.36 |
| Viscosity (cP) | 2,288 | 1,038 | 2,900 | 1,091 | 910 | 1,986 | 4,864 | 5,502 |
| C/(A + B) ratio | 0.89 | 0.76 | 0.89 | 0.89 | 0.76 | 0.89 | 0.89 | 0.89 |
| B/A Ratio | 1.03 | 1.37 | 0.34 | 0 | 0 | 0 | 0 | 0 |
| SiH/Vi Ratio | 10 | 8 | 10 | 10 | 8 | 10 | 10 | 10 |
| Initial Adhesion (g/inch) | 22.57 | 18.8 | 64.15 | 31.97 | 27.2 | 104.95 | 36.4 | 168.5 |
| 1 d aged adhesion (g/inch) | 65.07 | 58.8 | 220.8 | 257.93 | 122.6 | 643.5 | 197.25 | 688.85 |
| 3 d aged adhesion (g/inch) | 62.5 | 59.3 | 232.6 | 254.35 | 133.5 | 627.1 | 124.5 | 875.95 |
| Adhesion increase ratio 1 (1 d aged/Initial) | 2.88 | 3.13 | 3.44 | 8.07 | 4.51 | 6.13 | 5.42 | 4.09 |
| Adhesion increase ratio 2 (3 d aged/Initial) | 2.77 | 3.16 | 3.63 | 7.86 | 4.91 | 5.98 | 3.42 | 5.20 |
| Coating appearance | 9 | 8 | 9 | 2 | 2 | 2 | 4 | 6 |

The examples and comparative examples in Table 3 show that starting material (B) can improve initial adhesion, adhesion stability, and appearance under the conditions tested.

'Adhesion Increase ratios'. Adhesive increase ratio 1 was calculated as follows: (adhesion after 1 day aged/Initial adhesion). Adhesive increase ratio 2 was calculated as follows: (adhesion after 3 day aged/Initial adhesion). The

TABLE 4

|  | Comp. Ex.-10 | Ex.-8 | Ex.-1 | Ex.-4 | Ex.-9 | Ex.-10 | Ex. -11 | Ex.-12 |
|---|---|---|---|---|---|---|---|---|
| L-1 | 39.06 | 33.30 | 21.86 | 20.33 | 18.60 | 16.00 | 10.02 | 4.72 |
| QB-1 | 5.67 | 11.31 | 22.49 | 27.89 | 32.80 | 43.89 | 61.86 | 77.76 |
| MQ1 | 40.00 | 39.89 | 39.66 | 36.89 | 33.74 | 29.02 | 18.18 | 8.57 |
| XL-1 | 2.57 | 2.84 | 3.37 | 2.89 | 3.55 | 0.79 | 2.06 | 3.21 |
| XL-2 | 4.97 | 4.95 | 4.93 | 4.58 | 4.20 | 3.61 | 2.26 | 1.07 |
| D1 | 3.08 | 3.08 | 3.06 | 2.84 | 2.60 | 2.24 | 1.40 | 0.66 |
| F1 | 2.33 | 2.32 | 2.32 | 2.29 | 2.24 | 2.25 | 2.11 | 1.99 |
| G3 | 2.31 | 2.31 | 2.32 | 2.29 | 2.26 | 2.21 | 2.10 | 2.01 |
| Viscosity (cps) | 1520 | 1365 | 2288 | 1038 | 815 | 582 | 368 | 409 |
| C/(A + B) ratio | 0.89 | 0.89 | 0.89 | 0.76 | 0.66 | 0.48 | 0.25 | 0.10 |
| B/A Ratio | 0.15 | 0.34 | 1.03 | 1.37 | 1.76 | 2.74 | 6.17 | 16.46 |
| SiH/Vi Ratio | 10 | 10 | 10 | 8 | 8 | 3 | 3 | 3 |
| 25° C., 1 day | 29.95 | 29.65 | 22.57 | 18.80 | 7.5 | 3.5 | <1 | <1 |
| 70° C., 85% RH 1 day | 135.55 | 95.00 | 65.07 | 58.80 | 31 | 12 | 2.3 | <1 |
| 70° C., 85% RH, 3 days | 143.95 | 81.00 | 62.50 | 59.30 | 32.5 | 13.8 | 3.0 | 1.6 |
| Adhesion increase (1 d-aged/1 d - RT) | 4.53 | 3.20 | 2.88 | 3.13 | 4.1 | 3.42 | N/C | N/C |
| Adhesion increase (3 d-aged/1 d - RT) | 4.81 | 2.73 | 2.77 | 3.16 | 4.3 | 3.94 | N/C | N/C |
| Coating appearance | 5 | 9 | 9 | 8 | 9 | 8 | 9 | 8 |

In Table 4, 'N/C' means not calculated. Table 4 shows that when B/A ratio is too low, the adhesion increases too much after aging (poor adhesion stability).

Reference Example 2—Test Methods

Viscosity was measured at RT using rotational viscometry with a Brookfield viscometer DV-II.

Coating appearance (flatness) was measured after curing by optical microscopy using a transmitted light with an oblique illumination. The magnitude was ×8 for all samples. Different scores were ranked visually. The score was ranked based on the area of shrinkage in a fixed size (2 cm×2 cm) in the image. The higher the score, the better the coating appearance (and the more flatness) of the adhesive coating. When the score was: 8, the sample was acceptable. The higher the score, the better the coating appearance of (and the flatter) the adhesive coating.

Adhesion was measured by laminating the adhesive article samples prepared as described above onto glass substrates using 2 kg roller (twice-forward and back). A peel test measured for 25 mm was performed by peeling the adhesive article from the glass at an angle of 180° and a rate of 0.3 m/min using an adhesion tester, i.e., Cheminstruments adhesion/release tester model AR1500. Initial adhesion testing was performed on samples after 1 day at RT. Adhesion id-aged testing was performed as above after aging the samples at 70° C. and 85% relative humidity for 1 day. Adhesion 3-d aged testing was performed as above after aging the samples at 70° C. and 85% relative humidity for 3 days.

Alternatively, flatness of the pressures sensitive adhesive on the substrate was indirectly measured by calculating uneven adhesive coating caused blocking of adhesive onto tested substrates after aging and resulted in a higher adhesion increase ratio. Adhesion increase ratio 1 and/or adhesion increase ratio 2 may have a value less than 4.5, alternatively 0 to less than 4, and alternatively 0 to 3.5, and alternatively 0 to 3.

INDUSTRIAL APPLICABILITY

The adhesive article prepared by as described above is useful in electronics applications, such protection as a masking tape, carrier tape, or other protective film. In certain protection applications, it may be desirable for the pressure sensitive adhesive in the adhesive article to have low release force (e.g., adhesion of 15 g/inch or less to certain substrates). The pressure sensitive adhesive made by the composition and method described herein may have adhesion (as measured by peel force described in Reference Example 2) of 0.5 g/inch to 400 g/inch, alternatively 0.5 g/inch to 200 g/inch, for carrier tape applications.

The solventless silicone pressure sensitive adhesive composition used to prepare the pressure sensitive adhesive in the adhesive article described herein may have a viscosity of 300 mPa·s to 5,000 mPa·s, alternatively 300 mPa·s to 4,000 mPa·s, alternatively 500 mPa·s to 3,000 mPa·s, and alternatively 500 mPa·s to 2,500 mPa·s, as measured by the rotational viscometry technique described in Reference Example 2. Without wishing to be bound by theory, it is thought that when the adhesive article will be used in a protective film application, a low coating thickness (e.g., of 5 micrometers to 15 micrometers on a backing substrate) can be facilitated by viscosities in these ranges to ensure processability with conventional coating equipment and processes.

Furthermore, good optical properties (optical clarity) are desirable for certain protective film applications (e.g., screen protection). An adhesive article including a transparent backing substrate (such as PI or PET) and a low coating thickness e.g., of 5 micrometers to 15 micrometers) of a pressure sensitive adhesive with good coating appearance and flatness as measured by the techniques in Reference Example 1.

Definitions and Usage of Terms

Abbreviations used in the specification have the definitions in Table 5, below.

TABLE 5

Abbreviations

| Abbreviation | Definition |
|---|---|
| cP | centiPose |
| d | day |
| Da | Daltons |
| DP | degree of polymerization |
| FTIR | Fourier Transfer Infra-Red |
| GC | gas chromatography |
| GPC | gel permeation chromatography |
| Me | methyl |
| mPa · s | milli-Pascal seconds |
| NMR | nuclear magnetic resonance |
| Ph | phenyl |
| ppm | parts per million |
| RH | relative humidity |
| RT | room temperature of 25° C. |
| Vi | vinyl |

All amounts, ratios, and percentages are by weight unless otherwise indicated. The amounts of the starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

"Alkyl" means a branched or unbranched, saturated monovalent hydrocarbon group. Examples of alkyl groups include methyl, ethyl, propyl (including n-propyl and/or iso-propyl), butyl (including iso-butyl, n-butyl, tert-butyl, and/or sec-butyl), pentyl (including, iso-pentyl, neopentyl, and/or tert-pentyl); and hexyl, heptyl, octyl, nonyl, and decyl, as well as branched saturated monovalent hydrocarbon groups of 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Aralkyl" and "alkaryl" each refer to an alkyl group having a pendant and/or terminal aryl group or an aryl group having a pendant alkyl group. Exemplary aralkyl groups include benzyl, tolyl, xylyl, phenylethyl, phenyl propyl, and phenyl butyl. Aralkyl groups have at least 7 carbon atoms. Monocyclic aralkyl groups may have 7 to 12 carbon atoms, alternatively 7 to 9 carbon atoms, and alternatively 7 to 8 carbon atoms. Polycyclic aralkyl groups may have 7 to 17 carbon atoms, alternatively 7 to 14 carbon atoms, and alternatively 9 to 10 carbon atoms.

"Alkenyl" means a branched, or unbranched monovalent hydrocarbon group, where the monovalent hydrocarbon group has a double bond. Alkenyl groups include vinyl, allyl, and hexenyl. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means a branched, or unbranched monovalent hydrocarbon group, where the monovalent hydrocarbon group has a triple bond. Alkynyl groups include ethynyl and propynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom. Aryl is exemplified by, but not limited to, phenyl and naphthyl. Aryl groups have at least 5 carbon atoms. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms.

"Carbocycle" and "carbocyclic" refer to a hydrocarbon ring. Carbocycles may be monocyclic or polycyclic, e.g., bicyclic or with more than two rings. Bicyclic carbocycles may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated (e.g., cyclopentane or cyclohexane), partially unsaturated (e.g., cyclopentene or cyclohexene), or fully unsaturated (e.g., cyclopentadiene or cycloheptatriene).

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

"Monovalent hydrocarbon group" means a univalent group made up of hydrogen and carbon atoms. Monovalent hydrocarbon groups include alkyl, aralkyl, alkenyl, alkynyl, and cycloalkyl groups as defined above.

"Monovalent halogenated hydrocarbon group" means a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups and fluorinated cycloalkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl and chlorinated cycloalkyl groups such as chloromethyl, 3-chloropropyl 2,2-dichlorocyclopropyl, 2,3-dichlorocyclopentyl. Haloalkenyl groups include chloroallyl.

The term "comprising" and derivatives thereof, such as "comprise" and "comprises" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "–" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims.

Embodiments of the Invention

In a first embodiment, a solventless silicone pressure sensitive adhesive composition comprises:

(A) a polydiorganosiloxane comprising formula (A-1) $(R^1_2R^2SiO)$—$(R^1_2SiO)_a$—$(OSiR^1_2R^2)$, where each $R^1$ is independently selected from the group consisting of a monovalent hydrocarbon group free of terminal aliphatic unsaturation and a monovalent halogenated hydrocarbon group free of terminal aliphatic unsaturation, each $R^2$ is an independently selected monovalent hydrocarbon group with terminal aliphatic unsaturation, and subscript a has a value sufficient to impart a viscosity of 400 mPa·s to 100,000 mPa·s at 25° C. as measured by rotational viscometry to starting material (A);

(B) a branched polyorganosiloxane comprising unit formula (B-1) $(R^1_3SiO_{1/2})_g(R^1_2R^2SiO_{1/2})_h(R^1_2SiO_{2/2})_i(SiO_{4/2})_j$, where subscripts g, h, i, and j have average values such that 2≥g≥0, 4≥h≥0, 995≥i≥4, j=1, (g+h)=4, and a quantity (g+h+i+j) has a value sufficient to impart a viscosity of >170 mPa·s at 25° C. as measured by rotational viscometry to the branched polyorganosiloxane, where starting materials (A) and (B) are present in amounts sufficient to provide a weight ratio of starting material (B) to starting material (A) (B/A ratio) of 0.2/1 to 20/1, alternatively 0.3/1 to 17/1;

(C) a polyorganosilicate resin comprising monofunctional units ("M" units) of formula $R^M_3SiO_{1/2}$ and tetrafunctional silicate units ("Q" units) of formula $SiO_{4/2}$, where each $R^M$ is an independently selected monovalent organic group, which may be a monovalent hydrocarbon group or a monovalent halogenated hydrocarbon group, where starting materials (A), (B) and (C) are present in amounts sufficient to provide a weight ratio of amount of starting material (C) to combined amounts of starting materials (A) and (B) (resin/polymer ratio) of 0.05/1 to 1.5/1, alternatively 0.1/1 to 1.0/1, and alternatively 0.1/1 to 0.9/1;

(D) >0 to <5%, alternatively 0.5% to <5%, based on combined weights of all starting materials in the composition, of an olefinic reactive diluent;

(E) a polyorganohydrogensiloxane of unit formula (E-1) $(R^1_3SiO_{1/2})_p(R^1_2SiO_{2/2})_q(R^1SiO_{3/2})_r(SiO_{4/2})_s(R^1HSiO_{2/2})_t(R^1_2HSiO_{1/2})_u$, where subscripts p, q, r, s, t, and u have values such that p≥0, q≥0, r≥0, s≥0, t≥0, u≥0, (t+u)≥2, and a quantity (p+q+r+s+t+u) is sufficient to provide the polyorganohydrogensiloxane with a degree of polymerization of 5 to 100;

(F) a hydrosilylation reaction catalyst in an amount sufficient to provide 1 to 1000 ppm of platinum group metal based on combined weights of all starting materials in the composition; and (G) 0% to 5%, alternatively 1% to 5%, based on combined weights of all starting materials in the composition, of an anchorage additive;

where the starting materials are present in amounts such that a molar ratio of silicon bonded hydrogen atoms to terminally aliphatically unsaturated groups (SiH/Vi) ratio 1.5/1 to 50/1, alternatively 1.5/1 to 10/1, alternatively 3/1 to 10/1, and alternatively 8/1 to 10/1, based on combined molar amounts of all starting materials in the composition.

In a second embodiment, the solventless silicone pressure sensitive adhesive further comprises (H) 0.05% to 1% of a hydrosilylation reaction inhibitor, based on combined weights of all starting materials in the composition.

In a third embodiment, starting material (B) in the solventless silicone pressure sensitive adhesive composition comprises formula: $[R^2R^1Si$—$(O$—$SiR^1_2)_x$—$O]_y$—$Si$—$[O$—$(R^1_2SiO)_v SiR^1_3]w$, where each $R^1$ is independently selected from the group consisting of alkyl and aryl, each $R^2$ alkenyl; and subscripts v, w, x, and y have values such that 200≥v≥1, 2≥w≥0, 200≥x≥1, 4≥y≥0, and a quantity (w+y)=4.

In a fourth embodiment, in the solventless silicone pressure sensitive adhesive composition, starting material (C) comprises unit formula: $(R^1_3SiO_{1/2})_z(SiO_{4/2})_o$, where each $R^1$ is independently selected from the group consisting of alkyl and aryl, subscript o is as described above, and subscript z>4.

In a fifth embodiment, in the solventless silicone pressure sensitive adhesive composition, starting material (D) comprises 1% to 3% of an n-alkene of 14 to 16 carbon atoms.

In a sixth embodiment, in the solventless silicone pressure sensitive adhesive composition, starting material (E) comprises unit formula (E-2): $(R^1_3SiO_{1/2})_2(R^1_2SiO_{2/2})_{aa}(R^1HSiO_{2/2})_{bb}$, where each $R^1$ is selected from the group consisting of alkyl and aryl, subscript aa is 0 to 30, and subscript bb is 5 to 50.

In a seventh embodiment, in the solventless silicone pressure sensitive adhesive composition, starting material (F) comprises Karstedt's Catalyst.

In an eighth embodiment, in the solventless silicone pressure sensitive adhesive composition, starting material (G) comprises (G1) vinyltriacetoxysilane, (G2) glycidoxypropyltrimethoxysilane, or (G3) a reaction product of (G1) and (G2).

In a ninth embodiment, in the solventless silicone pressure sensitive adhesive composition, each $R^1$ is selected from the group consisting of methyl and phenyl, and each $R^2$ is independently selected from the group consisting of vinyl, allyl, and hexenyl.

In a tenth embodiment, the solventless silicone pressure sensitive adhesive composition has a viscosity of 300 to 5,000 mPa·s at 25° C. as measured by rotational viscometry.

In an eleventh embodiment, a method for preparing an adhesive article comprises:
1) combining starting materials to form a solventless silicone pressure sensitive adhesive composition, where the starting materials comprise
(A) a polydiorganosiloxane comprising formula (A-1) $(R^1{}_2R^2SiO)$—$(R^1{}_2SiO)_a$—$(OSiR^1{}_2R^2)$, where each $R^1$ is independently selected from the group consisting of a monovalent hydrocarbon group free of terminal aliphatic unsaturation and a monovalent halogenated hydrocarbon group free of terminal aliphatic unsaturation, each $R^2$ is an independently selected monovalent hydrocarbon group with terminal aliphatic unsaturation, and subscript a has a value sufficient to impart a viscosity of 400 mPa·s to 100,000 mPa·s at 25° C. as measured by rotational viscometry to starting material (A);
(B) a branched polyorganosiloxane comprising unit formula (B-1) $(R^1{}_3SiO_{1/2})_g(R^1{}_2R^2SiO_{1/2})_h(R^1{}_2SiO_{2/2})_i(SiO_{4/2})_j$, where subscripts g, h, i, and j have average values such that 2≥g≥0, 4≥h≥0, 995≥i≥4, j=1, (g+h)=4, and a quantity (g+h+i+j) has a value sufficient to impart a viscosity of >170 mPa·s at 25° C. as measured by rotational viscometry to the branched polyorganosiloxane,
where starting materials (A) and (B) are present in amounts sufficient to provide a weight ratio of starting material (B) to starting material (A) (B/A ratio) of 0.2/1 to 20/1;
(C) a polyorganosilicate resin comprising monofunctional units ("M" units) of formula $R^M{}_3SiO_{1/2}$ and tetrafunctional silicate units ("Q" units) of formula $SiO_{4/2}$, where each $R^M$ is an independently selected monovalent organic group, which may be a monovalent hydrocarbon group or a monovalent halogenated hydrocarbon group,
where starting materials (A), (B) and (C) are present in amounts sufficient to provide a weight ratio of amount of starting material (C) to combined amounts of starting materials (A) and (B) (resin/polymer or C/(A+B) ratio) of 0.05/1 to 1.5/1;
(D) 0.5% to <5%, based on combined weights of all starting materials in the composition, of an olefinic reactive diluent;
(E) a polyorganohydrogensiloxane of unit formula (E-1) $(R^1{}_3SiO_{1/2})_p(R^1{}_2SiO_{2/2})_q(R^1SiO_{3/2})_r(SiO_{4/2})_s(R^1HSiO_{2/2})_t(R^1{}_2HSiO_{1/2})_u$, where subscripts p, q, r, s, t, and u have values such that p≥0, q≥0, r≥0, s≥0, t≥0, u≥0, (t+u)≥2, and a quantity (p+q+r+s+t+u) is sufficient to provide the polyorganohydrogensiloxane with a degree of polymerization of 5 to 100;
(F) a hydrosilylation reaction catalyst in an amount sufficient to provide 1 to 1000 ppm of platinum group metal based on combined weights of all starting materials in the composition; and
(G) 1% to 5%, based on combined weights of all starting materials in the composition, of an anchorage additive;
where the starting materials are present in amounts such that a molar ratio of silicon bonded hydrogen atoms to terminally aliphatically unsaturated groups (SiH/Vi) ratio is 0.5/1 to 50/1, based on combined molar amounts of all starting materials in the composition;
2) coating the solventless silicone pressure sensitive adhesive composition on a surface of a backing substrate, and
3) curing the solventless silicone pressure sensitive adhesive composition to form a pressure sensitive adhesive on the surface of the backing substrate.

In a twelfth embodiment, the method further comprises treating the backing substrate before coating the composition on the surface.

In a thirteenth embodiment, the method further comprises: 4) adhering the pressure sensitive adhesive to an electronic device such that the pressure sensitive adhesive is between the backing substrate and the a surface of the electronic device.

In a fourteenth embodiment, a method comprises: adhering an adhesive article prepared by the method of any one of the eleventh to thirteenth embodiments to an electronic device during fabrication, performing processing steps on the electronic device, and thereafter removing the adhesive article from the electronic device.

In a fifteenth embodiment, a method comprises adhering an adhesive article prepared by the method of any one of the eleventh to thirteenth embodiments to an electronic device after fabrication and before shipping or end use of the device.

In a sixteenth embodiment, the adhesive article is optically transparent and the method further comprises using the adhesive article prepared by the method of any one of the eleventh to thirteenth embodiments for screen protection of an electronic device.

What is claimed is:

1. A solventless silicone pressure sensitive adhesive composition comprising:
   starting material (A) a polydiorganosiloxane comprising formula (A-1) $(R^1{}_2R^2SiO)$—$(R^1{}_2SiO)_a$—$(OSiR^1{}_2R^2)$, where each $R^1$ is independently selected from the group consisting of a monovalent hydrocarbon group free of terminal aliphatic unsaturation and a monovalent halogenated hydrocarbon group free of terminal aliphatic unsaturation, each $R^2$ is an independently selected monovalent hydrocarbon group with terminal aliphatic unsaturation, and subscript a has an average value of 150 to 2,000;
   starting material (B) a branched polyorganosiloxane comprising
      a Q branched polyorganosiloxane of unit formula (B-1) $(R^1{}_3SiO_{1/2})_g(R^1{}_2R^2SiO_{1/2})_h(R^1{}_2SiO_{2/2})_i(SiO_{4/2})_j$, where $R^1$ and $R^2$ are as described above, subscripts g, h, i, and j have average values such that 2≥g≥0, 4≥h≥0, 995≥i≥4, j=1, (g+h)=4, and a quantity (g+h+i+j) has a value sufficient to impart a viscosity>170 mPa·s to 1000 mPa·s at 25° C. as measured by rotational viscometry to the branched polyorganosiloxane,
      a T branched polyorganosiloxane of unit formula (B-3) $(R^1{}_3SiO_{1/2})_d(R^2R^1{}_2SiO_{1/2})_e(R^1{}_2SiO_{2/2})_m(R^1SiO_{3/2})_n$, where $R^1$ and $R^2$ are as described above, where subscript d≥0, subscript e>0, subscript m is 15 to 995, and subscript n>0, or both (B-1) and (B-3);
   where starting materials (A) and (B) are present in amounts sufficient to provide a molar ratio of starting material (B) to starting material (A) (B/A ratio) of 0.2/1 to 20/1;
   starting material (C) a polyorganosilicate resin comprising unit formula (C-1) $(R^1{}_3SiO_{1/2})_m(R^1{}_2R^2SiO_{1/2})_n(SiO_{4/2})_o$, where $R^1$ and $R^2$ are as described above, subscripts m, n and o have average values such that m≥0, n≥0, o>1, and a quantity (m+n)>4,
   where the staring materials (A), (B), and (C) are present in amounts sufficient to provide a weight ratio of amount of starting material (C) to combined amounts of starting materials (A) and (B) of 0.05/1 to 1.5/1;

starting material (D) >0% to <5%, based on combined weights of all starting materials in the composition, of an olefinic reactive diluent;

starting material (E) a polyorganohydrogensiloxane of unit formula (E-1) $(R^1_3SiO_{1/2})_p(R^1_2SiO_{2/2})_q(R^1SiO_{3/2})_r(SiO_{4/2})_s(R^1HSiO_{2/2})_t(R^1_2HSiO_{1/2})_u$, where $R^1$ is as described above, subscripts p, q, r, s, t, and u have values such that p≥0, q≥0, r≥0, s≥0, t≥0, u≥0, (t+u)≥2, and a quantity (p+q+r+s+t+u) is sufficient to provide the polyorganohydrogensiloxane with a degree of polymerization of 5 to 100; and starting material (F) a hydrosilylation reaction catalyst in an amount sufficient to provide 1 to 1000 ppm of platinum group metal based on combined weights of the starting materials (A) to (F) in the composition; where the starting materials (A) to (F) are present in amounts such that a molar ratio of silicon bonded hydrogen atoms to terminally aliphatically unsaturated groups (SiH/Vi) ratio is 1.5/1 to 10/1, based on combined molar amounts of the starting materials (A) to (F) in the composition.

2. The composition of claim 1, further comprising one or both of starting material (G) 1% to 5%, based on combined weights of all starting materials in the composition, of an anchorage additive and starting material (H) 0.05% to 1% of a hydrosilylation reaction inhibitor, based on combined weights of all starting materials in the composition.

3. The composition of claim 1, where in formula (A-1) each $R^1$ is independently selected from the group consisting of methyl and phenyl, each $R^2$ is independently selected from the group consisting of vinyl, allyl and hexenyl; and subscript a has a value sufficient to impart viscosity of 450 mPa·s to <100,000 mPa·s to starting material (A).

4. The composition of claim 1, where the starting material (B) further comprises formula (B-2):
$[R^2R^1_2Si—(O—SiR^1_2)_x—O]_y—Si—[O—(R^1_2SiO)_vSiR^1_3]_w$, where each $R^1$ is independently selected from the group consisting of methyl and phenyl, each $R^2$ is independently selected from the group consisting of vinyl, allyl, and hexenyl;

subscripts v, w, x, and y have values such that 200≥v≥1, 2≥w≥0, 200≥x≥1, 4≥y≥0, and a quantity (w+y)=4.

5. The composition of claim 1, where the starting material (C) comprises unit formula: $(R^1_3SiO_{1/2})_z(SiO_{4/2})_o$, where each $R^1$ is independently selected from the group consisting of methyl and phenyl, subscript o is as described for the starting material (C), and subscript z>4.

6. The composition of claim 1, where the starting material (D) comprises 1% to 3% of an n-alkene of 14 to 16 carbon atoms.

7. The composition of claim 1, where the starting material (E) comprises unit formula (E-2):
$(R^1_3SiO_{1/2})_2(R^1_2SiO_{2/2})_{aa}(R^1HSiO_{2/2})_{bb}$, where each $R^1$ is selected from the group consisting of methyl and phenyl, subscript aa is 0 to 30, and subscript bb is 5 to 50.

8. The composition of claim 1, where the starting material (F) comprises Karstedt's Catalyst.

9. The composition of claim 2, where the starting material (G) comprises (G-1) vinyltriacetoxysilane, (G-2) glycidoxypropyltrimethoxysilane, or (G-3) a combination of (G-1) and (G-2).

10. The composition of claim 1, where said composition has a viscosity of 300 mPa·s to 5,000 mPa·s at 25° C. as measured by rotational viscometry.

11. A method for preparing an adhesive article comprising:
1) coating the composition of claim 1 on a surface of a backing substrate, and
2) curing the composition to form a pressure sensitive adhesive on the surface of the backing substrate.

12. The method of claim 11, further comprising treating the backing substrate before coating the composition on the surface.

13. The method of claim 11, further comprising: 3) adhering the pressure sensitive adhesive to an electronic device such that the pressure sensitive adhesive is between the backing substrate and the surface of the electronic device.

* * * * *